United States Patent
Somes et al.

(10) Patent No.: US 11,665,208 B2
(45) Date of Patent: May 30, 2023

(54) SYSTEMS AND METHODS FOR SELECTIVELY ROUTING A SIP MESSAGE WITHOUT A PARAMETER IDENTIFYING A TELEPHONE NUMBER

(71) Applicant: Verizon Patent and Licensing Inc., Basking Ridge, NJ (US)

(72) Inventors: Brian Somes, Richardson, TX (US); Jodi A. Kelm, Miltona, MN (US); Shanthala Kuravangi-Thammaiah, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 102 days.

(21) Appl. No.: 17/210,143

(22) Filed: Mar. 23, 2021

(65) Prior Publication Data

US 2022/0311809 A1  Sep. 29, 2022

(51) Int. Cl.
*H04L 41/50* (2022.01)
*H04L 65/1069* (2022.01)
(Continued)

(52) U.S. Cl.
CPC .......... *H04L 65/1069* (2013.01); *H04L 41/50* (2013.01); *H04W 80/10* (2013.01); *H04L 41/5003* (2013.01)

(58) Field of Classification Search
CPC . H04L 65/1069; H04L 1080/10; H04L 41/50; H04L 41/5003
(Continued)

(56) References Cited

U.S. PATENT DOCUMENTS 8,401,004 B2 *  3/2013  Song ................. H04W 76/15
                                                370/402
10,911,374 B1 *  2/2021  Kumar ................ H04L 67/51
(Continued)

FOREIGN PATENT DOCUMENTS

CA       2618998 A1 *  2/2007  ........... H04L 5/1438

OTHER PUBLICATIONS

"Rich Communication Suite—Advanced Communications Services and Client Specification," GSM Association, Version 11.0, Oct. 16, 2019, 389 pages. [Retrieved from https://www.gsma.com/futurenetworks/wp-content/uploads/2019/10/RCC.07-v11.0.pdf on Mar. 23, 2021].
(Continued)

*Primary Examiner* — Khanh Q Dinh

(57) ABSTRACT

In some implementations, a device may receive a session initiation protocol (SIP) message. The device may determine that the SIP message does not include a parameter indicating that a first portion of the SIP message is to be processed as a telephone number. The device may perform one or more actions including one or more of: determining whether a second portion of the SIP message includes information identifying a service; determining whether the first portion of the SIP message includes a code; determining whether the first portion of the SIP message is formatted according to a format associated with a telephone number; or determining whether the first portion of the SIP message includes characters that are different than hexadecimal characters. The device may selectively cause the SIP message to be routed using the first portion of the SIP message or routed using the second portion of the SIP message.

20 Claims, 10 Drawing Sheets

(51) Int. Cl.
*H04W 80/10* (2009.01)
*H04L 41/5003* (2022.01)

(58) Field of Classification Search
USPC .................. 709/220, 224, 226, 228, 206
See application file for complete search history.

(56) References Cited

U.S. PATENT DOCUMENTS

| | | | | |
|---|---|---|---|---|
| 11,012,431 | B2* | 5/2021 | Kidambi | H04L 67/10 |
| 11,048,544 | B2* | 6/2021 | Jain | H04L 63/08 |
| 11,159,569 | B2* | 10/2021 | Janakiraman | H04L 12/66 |
| 11,218,407 | B2* | 1/2022 | Ramsland | H04L 45/748 |
| 11,283,876 | B2* | 3/2022 | Yazir | H04L 67/12 |
| 11,329,882 | B2* | 5/2022 | Christober | H04L 41/0816 |
| 11,363,113 | B1* | 6/2022 | Edwards | H04L 67/288 |
| 2008/0037533 | A1* | 2/2008 | Wah | H04L 65/10 370/389 |
| 2008/0062997 | A1* | 3/2008 | Nix | H04L 61/4511 370/395.2 |
| 2008/0267075 | A1* | 10/2008 | Yasrebi | H04L 61/106 370/242 |
| 2009/0190573 | A1* | 7/2009 | Siegel | H04L 12/66 370/352 |
| 2009/0191870 | A1* | 7/2009 | Siegel | H04L 65/1016 455/435.1 |
| 2009/0191871 | A1* | 7/2009 | Siegel | H04L 65/1073 455/435.1 |
| 2010/0128854 | A1* | 5/2010 | LaCroix | H04M 3/42221 379/265.09 |
| 2012/0300014 | A1* | 11/2012 | Krantz | H04N 7/147 348/E7.083 |
| 2017/0273046 | A1* | 9/2017 | Piscopo, Jr. | H04L 65/1073 |

OTHER PUBLICATIONS

Rosenberg et al., "SIP: Session Initiation Protocol," AT&T, Network Working Group, Standards Track, Request for Comments: 3261, Jun. 2002, 269 pages. [Retrieved from https://www.rfc-editor.org/rfc/pdfrfc/rfc3261.txt.pdf on Mar. 23, 2021].

Schulzrinne, "The tel URI for Telephone Numbers," Columbia University, Network Working Group, Standards Track, Request for Comments: 3966, Dec. 2004, 17 pages. [Retrieved from https://www.rfc-editor.org/rfc/pdfrfc/rfc3966.txt.pdf on Mar. 23, 2021].

* cited by examiner

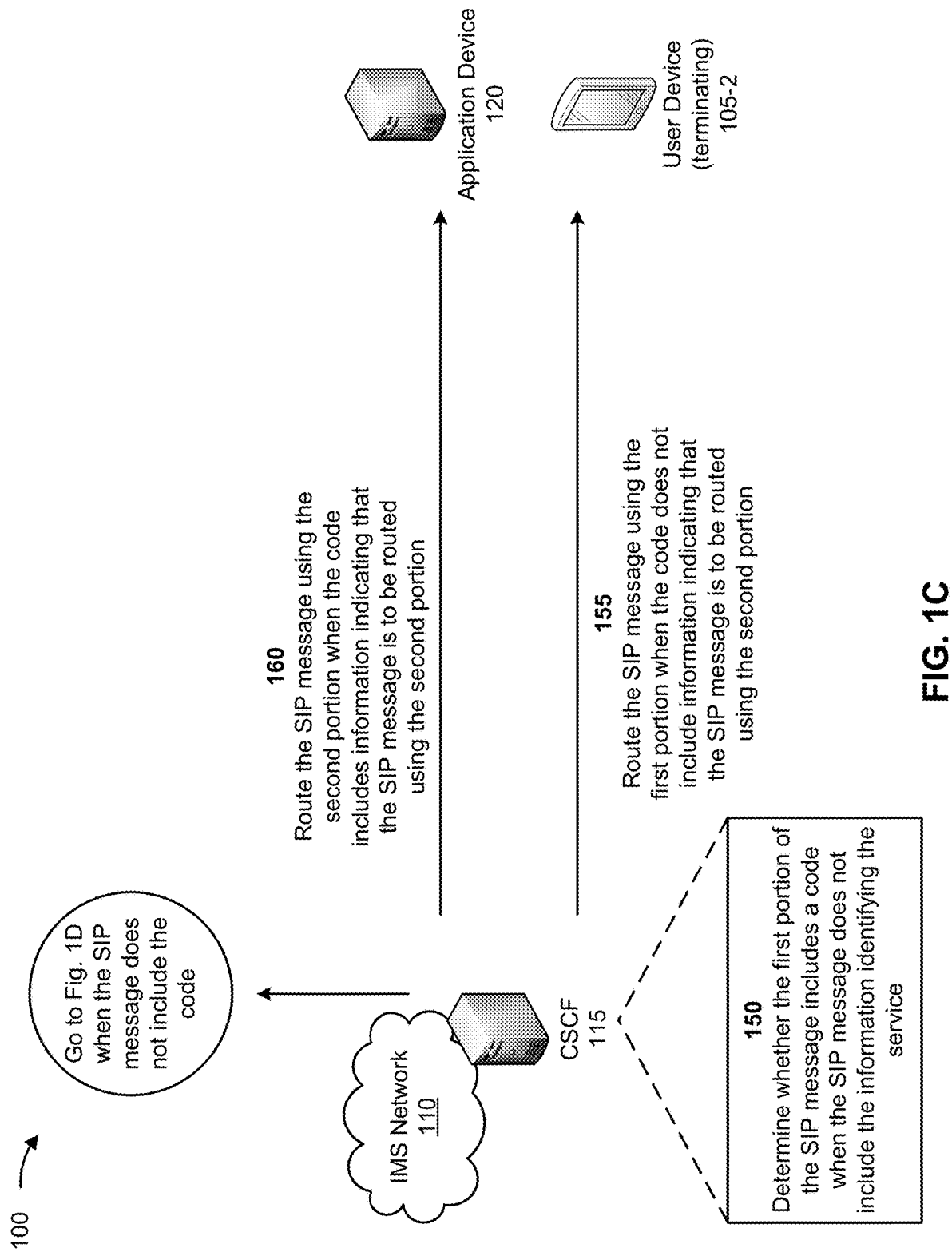

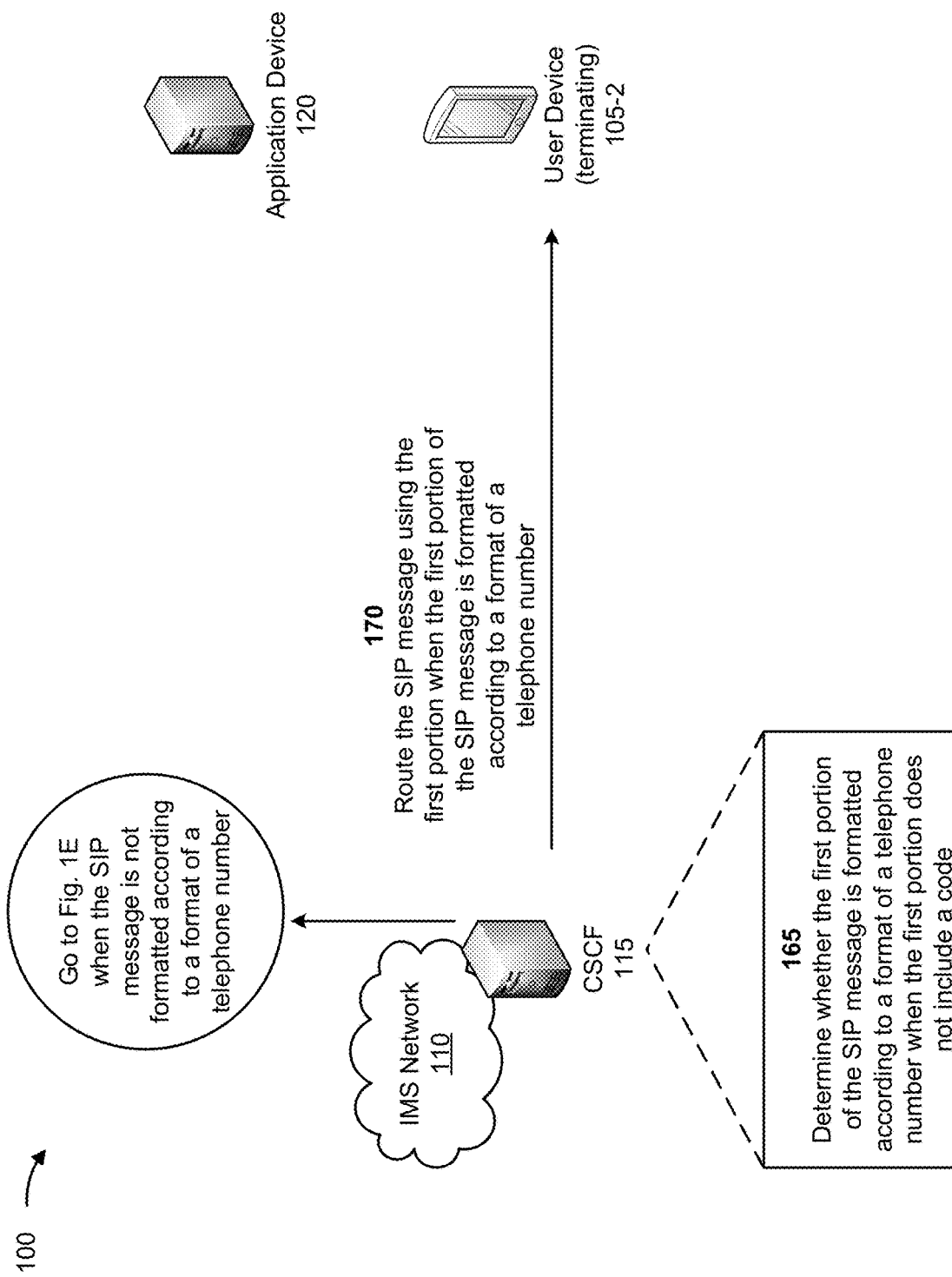

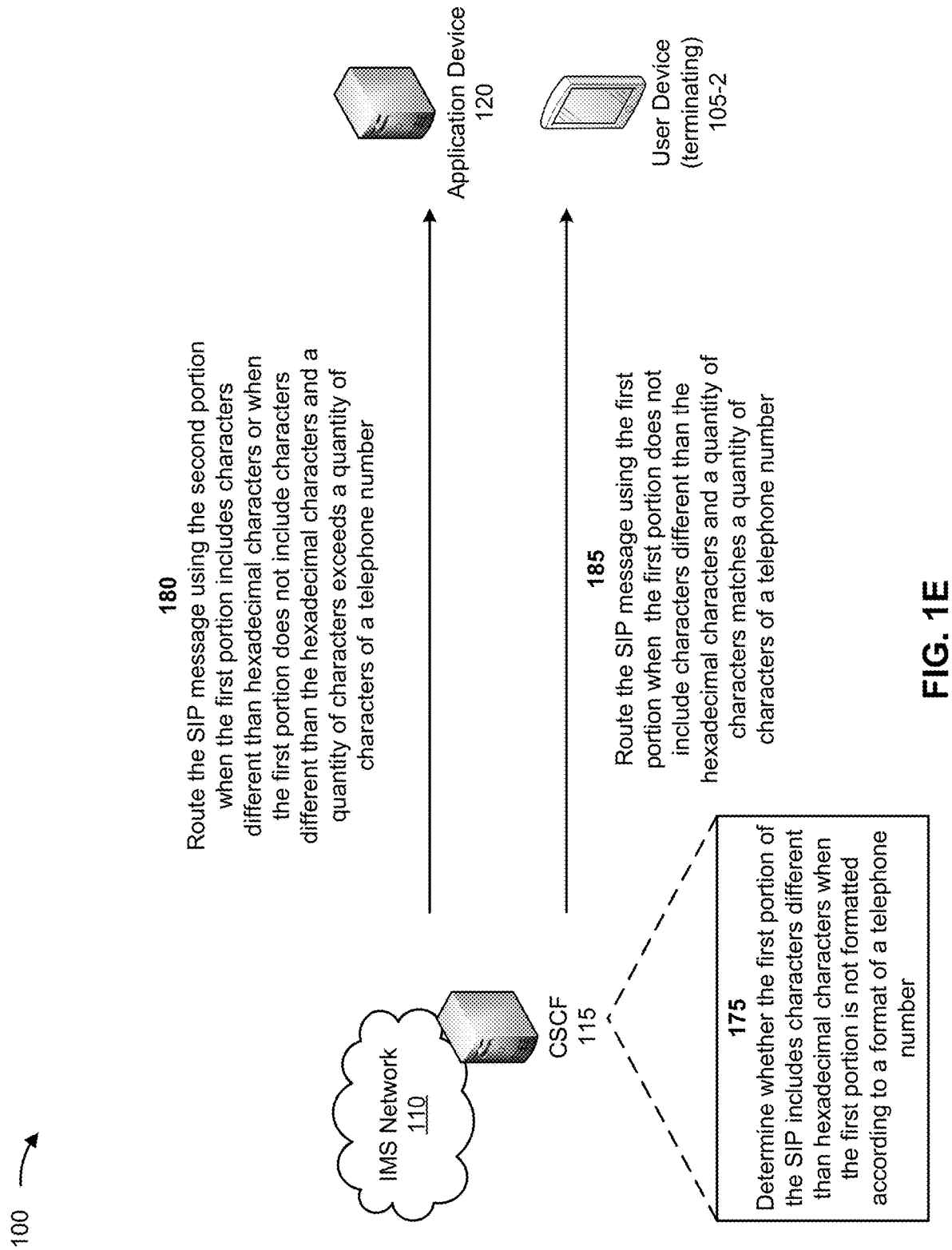

SYSTEMS AND METHODS FOR SELECTIVELY ROUTING A SIP MESSAGE WITHOUT A PARAMETER IDENTIFYING A TELEPHONE NUMBER

BACKGROUND

An Internet protocol (IP) multimedia subsystem (IMS) provides a platform for delivering IP multimedia services. An IMS network may utilize a session initiation protocol (SIP) to enable access to multimedia applications and/or voice applications via wired communications and/or wireless communications.

BRIEF DESCRIPTION OF THE DRAWINGS

FIGS. 1A-1G are diagrams of an example associated with selectively routing a session initiation protocol (SIP) message without a parameter identifying a telephone number.

DETAILED DESCRIPTION OF PREFERRED EMBODIMENTS

Figure 1A:
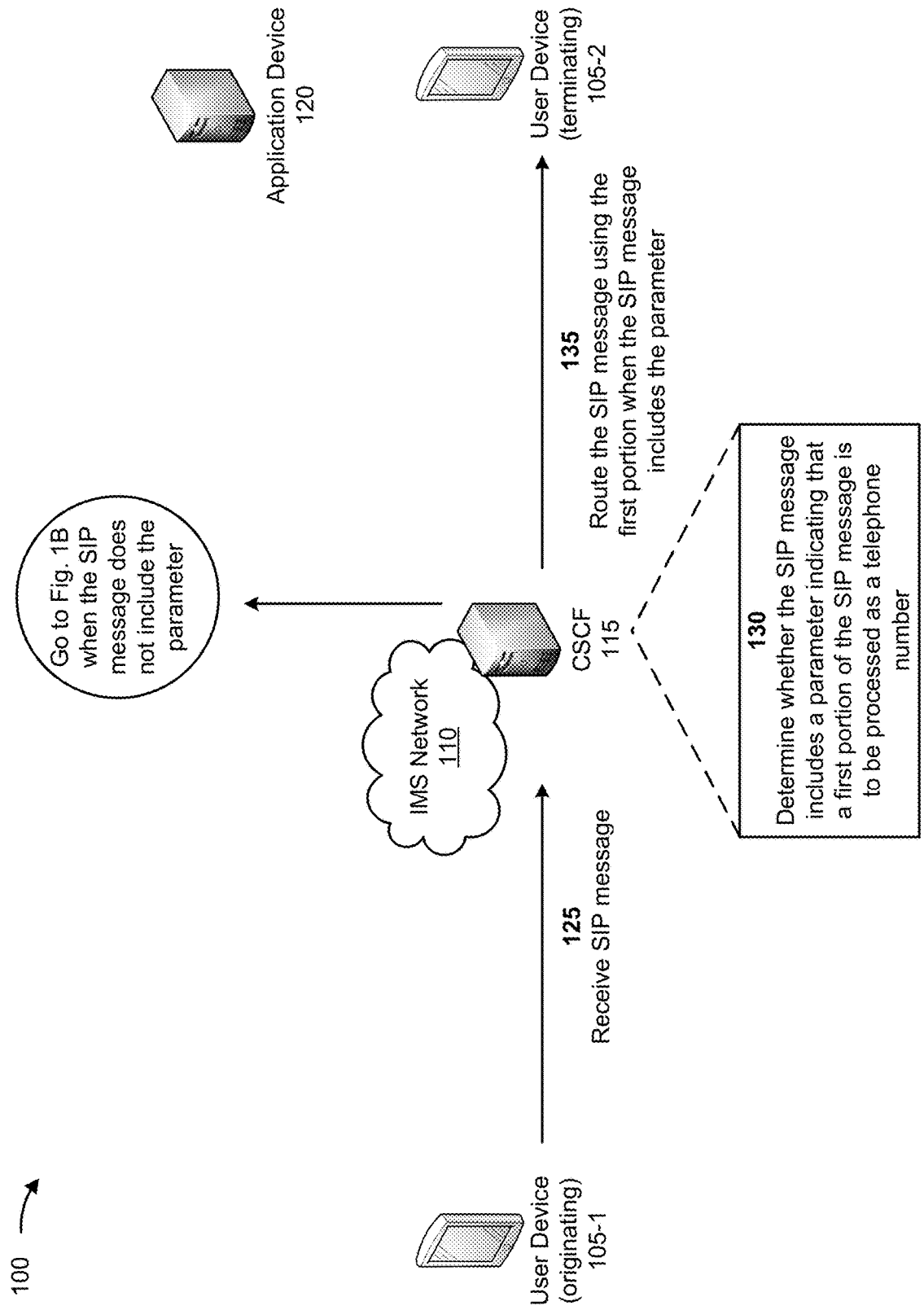

The following detailed description of example implementations refers to the accompanying drawings. The same reference numbers in different drawings may identify the same or similar elements.

A Call Session Control Function (CSCF) of an Internet protocol (IP) Multimedia Subsystem (IMS) network may receive a SIP message, in some cases provided by a first user device and destined for a second user device. A SIP uniform resource identifier (URI) of the SIP message includes a user information portion (e.g., portion before the "@" character) and a host portion (e.g., portion after the "@" character). The SIP message may include a parameter (e.g., "user=phone") indicating that the information included in the user information portion is to be processed as a telephone number. In such an instance, the CSCF may perform an E.164 number to URI mapping (ENUM) query using the information included in the user information portion. For example, the information included in the user information portion may be a telephone number formatted according to an E.164 telephone number format of the International Telecommunication Union Telecommunication Standardization Sector (ITU-T). The CSCF may cause the SIP message to be routed based on a result of performing the ENUM query. For example, based on the ENUM query, the CSCF may determine a destination associated with the telephone number (included in the user information portion) and may cause the SIP message to be routed toward the destination.

In some examples, the CSCF may receive a SIP message from the first user device that does not include the parameter "user=phone". In this instance, the SIP message may be destined for a chatbot service. For chatbot services, the SIP message may not include the parameter in accordance with RCC.07 guidance for chatbot communications. Additionally, the SIP URI of the SIP message may include (in the user information portion) information identifying the chatbot service (e.g., information identifying a chatbot session). The information identifying the chatbot service is not an E.164 formatted telephone number.

Currently, the CSCF is not configured to distinguish between SIP messages that are to be routed based on an ENUM query or routed without an ENUM query (e.g., routed based on a Fully Qualified Domain Name (FQDN) associated with the host portion). Accordingly, when the CSCS attempts to perform an ENUM query on the user information portion of the SIP message (destined for the chatbot service), the attempt is unsuccessful. By incorrectly performing an ENUM query using information identifying the chatbot service (instead of using an E.164 formatted telephone number), the CSCF consumes computing resources, network resources, and/or other resources associated with unsuccessfully performing the ENUM query multiples times, transmitting (to the first user device) a notification indicating that the SIP message cannot be routed, causing the user device to retransmit the SIP message, among other examples.

Some implementations described herein relate to routing rules that enable a device (e.g., a CSCF) to determine whether to route a SIP message based on an ENUM query or without an ENUM query (e.g., route the SIP message based on an FQDN associated with the host portion (or FQDN routing of the SIP message)). For example, the device may receive a SIP message that includes a SIP URI. The device may determine that the SIP message does not include a parameter indicating that a first portion of the SIP message (e.g., a first portion of the SIP URI) is to be processed as a telephone number. For instance, the device may determine that the SIP message does not include the parameter "user=phone", though other indications may also be contemplated. Based on determining that the SIP message does not include the parameter, the device may perform one or more actions.

For example, the device may determine whether a second portion of the SIP message (e.g., a second portion of the SIP URI) includes information identifying a service, such as information identifying a service related to a chatbot, information identifying a service related to rich communication services (RCS), among other examples. Additionally, or alternatively, the device may determine whether the first portion of the SIP message includes a code, such as a short code, a feature code, among other examples. Additionally, or alternatively, the device may determine whether the first portion of the SIP message is formatted according to a format associated with a telephone number (e.g., an E.164 telephone number format). Additionally, or alternatively, the device may determine whether the first portion of the SIP message includes one or more characters that are different than hexadecimal characters.

Based on performing the one or more actions, the device may selectively cause the SIP message to be routed using the first portion of the SIP message or routed using the second portion of the SIP message. For example, the device may selectively cause the SIP message to be routed based on a result of performing an ENUM query or routed based on an FQDN associated with the second portion of the SIP URI. By enabling the device (e.g., CSCF) to determine a manner for routing a SIP message as explained herein, the device may preserve computing resources (e.g., processor resources, memory resources, communication resources, among other examples), network resources, and/or other resources that would have otherwise been consumed by unsuccessfully performing the ENUM query multiples times, transmitting (to the user device) a notification indicating that the SIP message cannot be routed, causing the user device to retransmit the SIP message, among other examples.

FIGS. 1A-1G are diagrams of an example 100 associated with selectively routing a session initiation protocol (SIP) message without a parameter identifying a telephone number. As shown in FIGS. 1A-1G, example 100 includes user devices 105, an Internet protocol (IP) Multimedia Subsystem (IMS) network 110, a Call Session Control Function (CSCF) 115, and an application device 120. Each of user device 105 may include a wireless communication device, a mobile phone, a laptop computer, a tablet computer, a desktop computer, among other examples, as described herein. In some implementations, CSCF 115 may be included in IMS network 110 and may include one or more devices for receiving, processing, and causing SIP messages to be routed toward one or more destinations of the SIP messages. In some examples, CSCF 115 may include a proxy-CSCF (P-CSCF), an interrogating-CSCF (I-CSCF), and/or a Serving-CSCF (S-CSCF).

Application device 120 may include one or more devices (e.g., one or more network devices) that host and execute applications such one or more applications related to rich communication services (RCS), one or more applications related to one or more chatbot services, among other examples. Although FIGS. 1A-1G describe CSCF 115 interacting with the devices described herein, in some implementations, CSCF 115 may interact with different devices and different quantity of devices in a similar manner.

As shown in FIG. 1A, and by reference number 125, CSCF 115 may receive a SIP message. For example, CSCF 115 may receive the SIP message from user device 105-1. The SIP message may include a uniform resource identifier (URI). In some examples, the SIP message may be a SIP invite message and the URI (of the SIP message) may be a request URI (R-URI). For instance, user device 105-1 may provide the SIP message in effort to establish a call with user device 105-2. Alternatively, user device 105-1 may provide the SIP message in effort to access an application of application device 120. For example, user device 105-1 may provide the SIP message in order to interact with a chatbot application hosted by application device 120.

In some implementations, CSCF 115 may analyze the URI (e.g., the R-URI) to determine whether the URI is a Tel URI or a SIP URI. For example, CSCF 115 may analyze a format of the URI to determine whether the format of the URI is a format of a Tel URI (e.g., "tel:1234567890; phone-context=358-555") or a format of a SIP URI (e.g., "sip:1234567890@hostname SIP/2.0"). If CSCF 115 determines that the URI is a Tel URI (e.g., the format of the URI is a format of a Tel URI), CSCF 115 may perform an E.164 number to URI mapping (ENUM) query using the telephone number included in the Tel URI and may cause the SIP message to be routed based on a result of performing the ENUM query. For example, CSCF 115 may perform a look-up of an ENUM data structure to determine a destination associated with the telephone number and may cause the SIP message to be routed toward the destination (e.g., routed toward user device 105-2).

In some implementations, the ENUM data structure may store E.164 telephone numbers in association with URIs (e.g., destination addresses such as network addresses). The ENUM data structure may include a database, a table, a linked list, among other examples. A format of the telephone number may be an E.164 telephone number format of the International Telecommunication Union Telecommunication Standardization Sector (ITU-T). In some examples, CSCF 115 may determine a destination address associated with an I-CSCF of another IMS network, based on performing the ENUM query. CSCF 115 may provide the SIP message to the I-CSCF to cause the I-CSCF to route the SIP message, such as to cause the I-CSCF to route the SIP message toward user device 105-2.

As shown in FIG. 1A, and by reference number 130, CSCF 115 may determine whether the SIP message includes a parameter indicating that a first portion of the SIP message is to be processed as a telephone number. For example, assume that CSCF 115 determines that the URI is a SIP URI. Based on determining that the URI is a SIP URI, CSCF 115 may determine whether the SIP URI includes the parameter indicating that a first portion of the SIP URI is to be processed as a telephone number. For example, CSCF 115 may analyze the SIP URI to determine whether the SIP URI includes the parameter "user=phone."

As shown in FIG. 1A, and by reference number 135, CSCF 115 may route the SIP message using the first portion when the SIP message includes the parameter indicating processing as a telephone number. For example, assume that CSCF 115 determines that the SIP URI includes the parameter "user=phone." Based on determining that the SIP URI includes the parameter "user=phone," CSCF 115 may determine that the first portion of the SIP URI includes a telephone number and, accordingly, may cause the SIP message to be routed using the first portion of the SIP URI. The first portion of the SIP URI may correspond to a user information portion of the SIP URI (e.g., a portion preceding the "@" character in the SIP URI). The parameter "user=phone" may indicate that the first portion of the SIP URI includes a telephone number. A format of the telephone number may be an E.164 telephone number format of the International Telecommunication Union Telecommunication Standardization Sector.

Based on determining that the SIP URI includes the parameter "user=phone," CSCF 115 may perform an ENUM query using the first portion of the SIP URI, such as using the telephone number included in the first portion of the SIP URI), in a manner similar to the manner described above. CSCF 115 may cause the SIP message to be routed (e.g., toward user device 105-2) based on a result of performing the ENUM query, in a manner similar to the manner described above.

Figure 1B:
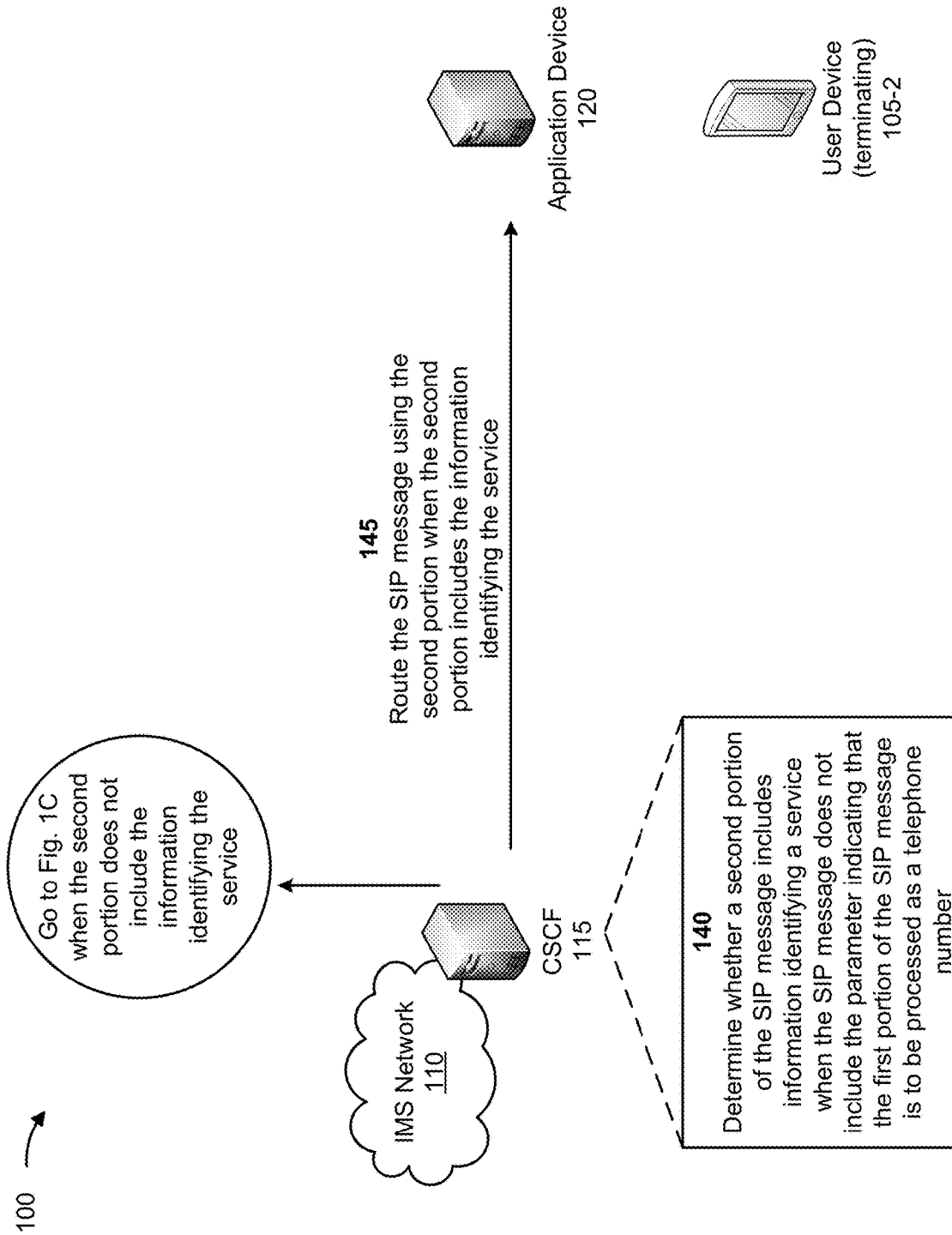

As shown in FIG. 1B, and by reference number 140, CSCF 115 may determine whether a second portion of the SIP message includes information identifying a service when the SIP message does not include the parameter indicating that the first portion of the SIP message is to be processed as a telephone number. For example, assume that CSCF 115 determines that the SIP URI does not include the parameter "user=phone." Based on determining that the SIP URI does not include the parameter "user=phone," CSCF 115 may analyze the SIP URI (e.g., analyze a second portion of the SIP URI) to determine whether a second portion of the SIP URI includes the information identifying the service. The second portion of the SIP URI may correspond to a host information portion of the SIP URI, such as a portion following the "@" character of the SIP URI. The service may include a service related to RCS communications, a service related to a chatbot application (e.g., a chatbot service), among other examples.

As shown in FIG. 1B, and by reference number 145, CSCF 115 may route the SIP message using the second portion when the second portion includes the information identifying the service. For example, assume that CSCF 115 determines that the second portion of the SIP URI includes the information identifying the service. For instance, assume that the service is a chatbot service of a chatbot application hosted by application device 120, that user device 105-1 has provided the SIP message in order to interact with the chatbot service, and that the second portion of the SIP URI includes the keyword "botplatform" (e.g., the information identifying the chatbot service).

In this regard, based on analyzing the second portion of the SIP URI, CSCF 115 may determine that the second portion of the SIP URI includes the information identifying the chatbot service (e.g., the keyword "botplatform"). As an example, if the SIP URI is "sip:2165845b-d039-4249-ac35-6c86e0cceeb1@botplatform.xyz.us.sncrmmp.com SIP/2.0," the information identifying the chatbot service (e.g., the keyword "botplatform") (included in the second portion of the SIP URI) may provide an indication to CSCF 115 that the host portion is associated with a Fully Qualified Domain Name (FQDN). For example, CSCF 115 may determine that the keyword "botplatform" is indicative of a chatbot FQDN.

CSCF 115 may cause the SIP message to be routed using the second portion of the SIP URI, based on determining that the host portion is associated with an FQDN. In some implementations, based on determining that the host portion is associated with an FQDN, CSCF 115 may perform a domain name system (DNS) resolution process using the host information to determine a network address associated with the host of the service, such as a network address associated with application device 120. CSCF 115 may cause the SIP message to be routed toward the network address. In some examples, CSCF 115 may cause the SIP message to be routed toward the network address based on a routing data structure (e.g., a routing table) of CSCF 115.

Alternatively to performing the DNS resolution process, CSCF 115 may provide the SIP message to a session router/session border controller (SR/SBC) to cause the SR/SBC to route the SIP message toward the network address associated with application device 120. CSCF 115 may cause the SIP message to be routed using the second portion of the SIP URI (as explained herein) even if the first portion of the SIP URI includes a telephone number and a format of the telephone number is an E.164 telephone number format of the ITU-T. The process of causing the SIP message to be routed toward the network address using the second portion of the SIP URI (e.g., using the FQDN associated with the second portion of the SIP URI) may be referred to hereinafter as FQDN routing.

While the example described herein refers to the service as being a chatbot service and refers to the information identifying the service as including the keyword "botplatform," the information identifying the service may include partial or full domain names that may identify other types of services.

As shown in FIG. 1C, and by reference number 150, CSCF 115 may determine whether the first portion of the SIP message includes a code when the SIP message does not include the information identifying the service. For example, assume that CSCF 115 determines that the second portion of the SIP URI does not include the information identifying the service. Based on determining that the second portion of the SIP URI does not include the information identifying the service, CSCF 115 may analyze the SIP URI to determine whether the first portion of the SIP URI includes a code. In some implementations, the code may include a sequence of characters. In some examples, the code may include a combination of a special character and alphanumeric characters, such as a combination of a "*" character and alphanumeric characters or a combination of a "#" character and alphanumeric characters. In some implementations, a quantity of characters included in the code may be less than a quantity of characters included in a telephone number formatted according to an E.164 telephone number format of the ITU-T. For example, the code may include a feature code, a short code, among other examples.

Assume that, based on analyzing the first portion of the SIP URI, CSCF 115 determines that the first portion of the SIP URI includes the code. For example, assume that CSCF 115 determines that the first portion includes a combination of a special character and alphanumeric characters and/or that the quantity of characters included in the code is less than the quantity of characters included in a telephone number formatted according an E.164 telephone number format. Based on determining that the first portion of the SIP URI includes the code, CSCF 115 may determine whether the code provides an indication that the SIP message is to be routed by way of the FQDN routing, as explained above. For example, CSCF 115 may perform a look-up of a data structure (e.g., associated with CSCF 115) using the code to determine whether the code is associated with information indicating that the SIP message is to be routed by way of the FQDN routing.

As shown in FIG. 1C, and by reference number 155, CSCF 115 may route the SIP message using the first portion when the code does not include information indicating that the SIP message is to be routed using the second portion. For example, assume that CSCF 115 determines that the code does not provide the indication that the SIP message is to be routed by way of the FQDN routing. For instance, assume that CSCF 115 determines that the code is a short code for two-way messaging with user device 105-2. Based on determining that the code does not provide the indication, CSCF 115 may provide the SIP message to a telephony application server (TAS) for processing. For example, CSCF 115 may provide the SIP message to TAS to cause the TAS to route the SIP message, such as to route the SIP message toward user device 105-2). In some examples, the TAS may cause the SIP message to be routed toward the SR/SBC for routing toward user device 105-2.

As shown in FIG. 1C, and by reference number 160, CSCF 115 may route the SIP message using the second portion when the code includes information indicating that the SIP message is to be routed using the second portion. For example, assume that user device 105-1 provides the SIP message in order to interact with the chatbot service (e.g., hosted by application device 120). Further assume that CSCF 115 determines that the code provides the indication that the SIP message is to be routed by way of the FQDN routing. For example, assume that CSCF 115 determines that the code is a short code to interact with the chatbot service. Based on determining that the code provides the indication, CSCF 115 may cause the SIP message to be routed by way of FQDN routing, in a manner similar to the manner described above in connection with FIG. 1B. For example, CSCF 115 may cause the SIP message to be routed based on the FQDN associated with the second portion of the SIP URI.

As shown in FIG. 1D, and by reference number 165, CSCF 115 may determine whether the first portion of the SIP message is formatted according to a format of a telephone number when the first portion does not include a code. For example, assume that CSCF 115 determines that the first portion of the SIP URI does not include a code (e.g., the first portion does not include a short code or a feature code). Based on determining that the first portion of the SIP URI does not include a code, CSCF 115 may analyze the SIP URI to determine whether the first portion of the SIP URI includes information that is formatted according to an E.164 telephone number format of the ITU-T. For example, CSCF 115 may determine whether the first portion of the SIP URI includes a telephone number that is formatted according to the E.164 telephone number format. In some implementations, CSCF 115 may analyze the first portion of the SIP URI to determine whether the first portion includes the character "+" in combination with a country code (e.g., country codes defined according to an E.164 telephone number format of the ITU-T) followed a plurality of digits, though other embodiments may differ in search criteria used to identify a telephone number or user contact format.

As shown in FIG. 1D, and by reference number 170, CSCF 115 may route the SIP message using the first portion when the first portion of the SIP message is formatted according to a format of a telephone number. For example, assume that CSCF 115 determines that the first portion of the SIP URI includes information that is formatted according to the E.164 telephone number format of the ITU-T. For instance, assume that CSCF 115 determines that the SIP URI includes a telephone number that is formatted according to the E.164 telephone number format. Based on determining that the first portion of the SIP URI includes information that is formatted according to the E.164 telephone number format, CSCF 115 may perform an ENUM query using the first portion of the SIP URI (e.g., using the telephone number included in the first portion of the SIP URI), in a manner similar to the manner described above. CSCF 115 may cause the SIP message to be routed (e.g., toward user device 105-2) based on a result of performing the ENUM query, in a manner similar to the manner described above in connection with FIG. 1A.

In some embodiments, CSCF 115 may determine whether the first portion includes a particular character in combination with a plurality of digits. In some examples, the particular character may include an exclamation point, a question mark, a hash tag, another special character, among other examples. In some implementations, the particular character may be selected by an administrator of core network 210. In some examples, the plurality of digits may be formatted according to the E.164 telephone number format. Based on determining that the first portion includes the particular character in combination with the plurality of digits (as explained above), CSCF 115 may cause the SIP message to be routed using the second portion of the SIP URI, in a manner similar to the manner described above in connection with FIG. 1B. For example, if the second portion of the SIP URI includes "! 2147320000@host.com," CSCF 115 may cause the SIP message to be routed using the second portion of the SIP URI based on the second portion including the character "!" in combination with digits formatted according to the E.164 telephone number format. For instance, CSCF 115 may cause the SIP message to be routed to a server device associated with "host.com."

As shown in FIG. 1E, and by reference number 175, CSCF 115 may determine whether the first portion of the SIP includes one or more characters different than hexadecimal characters when the first portion is not formatted according to a format of a telephone number. For example, assume that CSCF 115 determines that the first portion of the SIP URI is not formatted according to the E.164 telephone number format. Based on determining that the first portion of the SIP URI is not formatted according to the E.164 telephone number format, CSCF 115 may analyze the first portion to determine whether the first portion includes one or more alpha characters (e.g., one or more letters) that are not hexadecimal characters, such as characters that are not the characters "A," "B," "C," "D," "E," or "F."

As shown in FIG. 1E, and by reference number 180, CSCF 115 may route the SIP message using the second portion when the first portion includes characters different than hexadecimal characters or when the first portion does not include characters different than the hexadecimal characters and a quantity of characters exceeds a quantity of characters of a telephone number. For example, assume that, based on analyzing the first portion of the SIP URI, CSCF 115 determines that the first portion includes one or more alpha characters (e.g., one or more letters) that are not hexadecimal characters, such as characters that are not the characters "A," "B," "C," "D," "E," or "F." As an example, if the SIP URI is "sip:i10eeecb-8076-4d6c-ab83-d479571f23f3@botplatform.xyz.us.sncrmmp.com SIP/2.0," CSCF 115 may determine that the first portion of the SIP URI includes the letter "i" and that the letter "i" is not a hexadecimal character.

Based on determining that the first portion of the SIP URI includes a character that is not a hexadecimal character, CSCF 115 may determine that the first portion of the SIP URI includes information identifying a service, as described above in connection with FIG. 1B. For example, CSCF 115 may determine that the first portion of the SIP URI includes information identifying a chatbot service (e.g., an identifier of a chatbot service, an identifier of a session associated with a chatbot service, among other examples). Accordingly, CSCF 115 may determine that the second portion of the SIP URI is associated with an FQDN (e.g., associated with a chatbot FQDN). CSCF 115 may cause the SIP message to be routed using the second portion of the SIP URI, based on determining that the second portion of the SIP URI is associated with an FQDN, in a manner similar to the manner described above in connection with FIG. 1B.

In some implementations, CSCF 115 may determine whether the quantity of characters (included in the first portion of the SIP URI) matches a quantity of characters of an E.164 telephone number. Assume that CSCF 115 determines that the quantity of characters (included in the first portion of the SIP URI) matches the quantity of characters of an E.164 telephone number. Further assume that the characters (included in the first portion of the SIP URI) include hexadecimal characters and/or digits, such as decimal digits. CSCF 115 may analyze the first portion of the SIP URI to determine whether the characters provide an indication that the SIP message is to be routed based on FQDN routing, instead of being routed based on a result of performing an ENUM query. For example, CSCF 115 may analyze the first portion of the SIP URI to determine whether an entirety of the characters provides an indication that the SIP message is to be routed based on FQDN routing or whether a portion of the characters (e.g., a prefix) provides an indication that the SIP message is to be routed based on FQDN routing. For example, CSCF 115 may determine whether the portion identifies a particular hexadecimal code, a service access code, among other examples associated with FQDN routing. For example, if the first portion of the SIP URI includes "9992147326951," CSCF 115 may determine that "999" is an indication that the SIP message is to be routed based on FQDN routing because, for example, "999" is not a country code associated with E.164 telephone numbers. As another example, if the first portion of the SIP URI includes "FFF2147320000," CSCF 115 may determine that "FFF" is an indication that the SIP message is to be routed based on FQDN routing because, for example, "FFF" is not a country code associated with E.164 telephone numbers.

Assume that CSCF 115 determines that the first portion of the SIP URI does not include one or more alpha characters (e.g., one or more letters) that are not hexadecimal characters. Based on determining that the first portion of SIP URI does not include one or more alpha characters that are not hexadecimal characters, CSCF 115 may determine whether the quantity of characters included in the first portion of the SIP URI exceeds the quantity of characters of a telephone number (or a threshold quantity of characters determined by a network provider associated with CSCF 115). For example, CSCF 115 may determine whether the quantity of characters (included in the first portion of the SIP URI) exceeds a quantity of characters of an E.164 telephone number (or the threshold quantity of characters). For instance, CSCF 115 may compare the quantity of characters (included in the first portion of the SIP URI) and the quantity of characters of an E.164 telephone number (or the threshold quantity of characters).

Assume that CSCF 115 determines that the quantity of characters (included in the first portion of the SIP URI) exceeds the quantity of characters of an E.164 telephone number (or the threshold quantity of characters). In some implementations, based on determining that the quantity of characters (included in the first portion of the SIP URI) exceeds the quantity of characters of an E.164 telephone number (or the threshold quantity of characters), CSCF 115 may determine that the first portion of the SIP URI includes information identifying a service (as explained above) or that the first portion of the SIP URI includes information identifying an RCS server. Based on determining that the quantity of characters (included in the first portion of the SIP URI) exceeds the quantity of characters of an E.164 telephone number (or the threshold quantity of characters), CSCF 115 may determine that the second portion of the SIP URI is associated with an FQDN and may cause the SIP message to be routed using the second portion of the SIP URI, in a manner similar to the manner described above in connection with FIG. 1B.

As shown in FIG. 1E, and by reference number 185, CSCF 115 may route the SIP message using the first portion when the first portion does not include characters different than the hexadecimal characters and a quantity of characters matches a quantity of characters of a telephone number. For example, assume that CSCF 115 determines that the first portion of the SIP URI does not include one or more alpha characters (e.g., one or more letters) that are not hexadecimal characters and that the quantity of characters (included in the first portion of the SIP URI) matches the quantity of characters of an E.164 telephone number (or the threshold quantity of characters). Based on determining that the quantity of characters (included in the first portion of the SIP URI) matches the quantity of characters of an E.164 telephone number (or the threshold quantity of characters), CSCF 115 may determine that the first portion of the SIP URI includes an E.164 telephone number. Accordingly, CSCF 115 may perform an ENUM query using the first portion of the SIP URI and may cause the SIP message to be routed based on a result of performing the ENUM query, in a manner similar to the manner described above in connection with FIG. 1A.

Figure 1F:
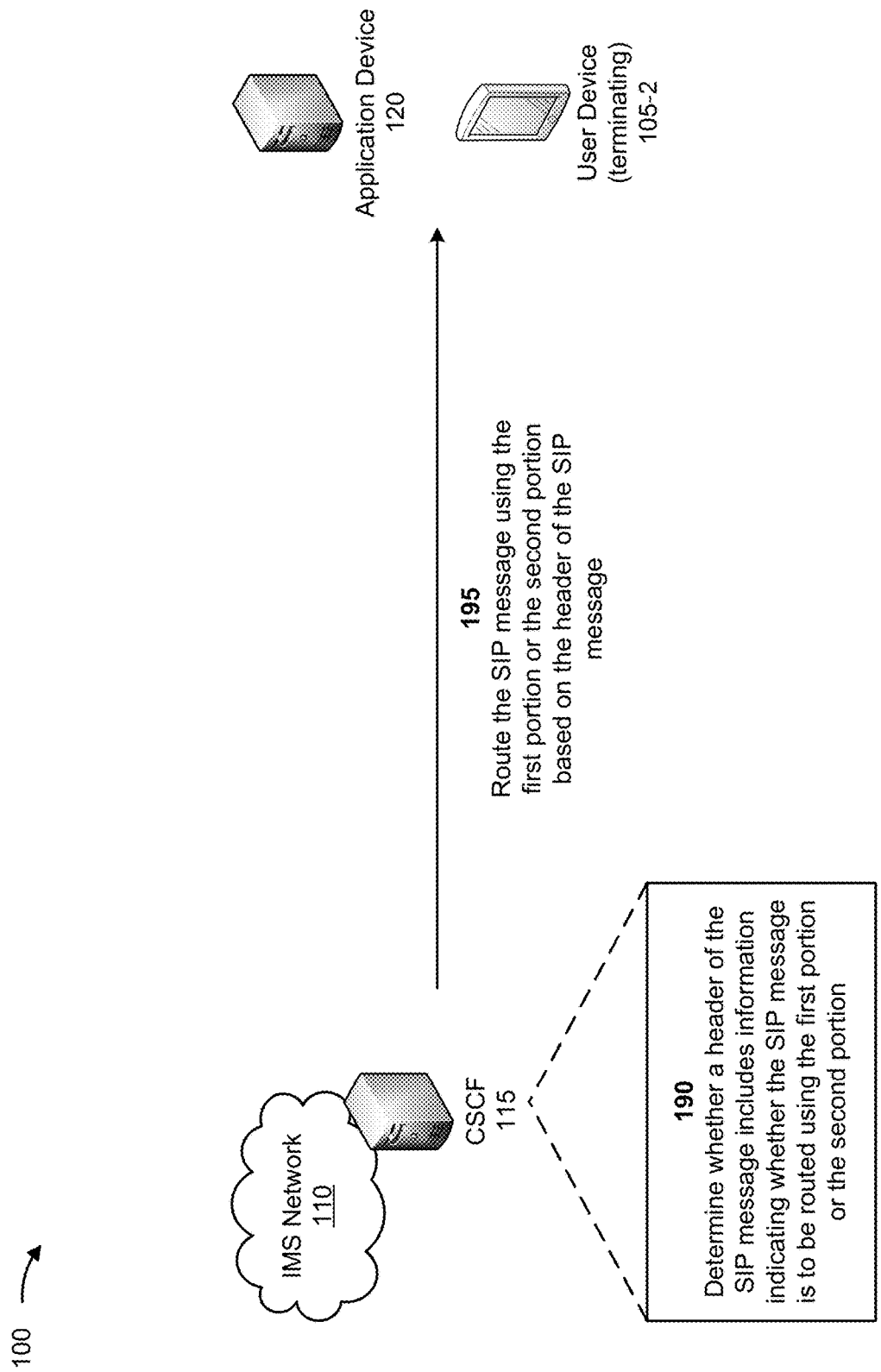

As shown in FIG. 1F, and by reference number 190, CSCF 115 may determine whether a header of the SIP message includes information indicating whether the SIP message is to be routed using the first portion or the second portion. In some implementations, based on determining that the first portion does not include one or more alpha characters that are not hexadecimal characters, CSCF 115 may determine whether the header of the SIP message includes information indicating whether the SIP message is to be routed based on a result of performing an ENUM query using the first portion of the SIP URI or routed based on an FQDN associated with the second portion of the SIP URI.

For example, CSCF 115 may determine whether the header indicates that the SIP message is supporting "mmtel." For example, CSCF 115 may determine whether the header includes the keyword "mmtel.". The SIP message supporting "mmtel" may indicate that the SIP message is to be routed based on a result of performing an ENUM query, in some cases because SIP messages including the keyword "mmtel" are routed based on a result of an ENUM query. Alternatively, CSCF 115 may determine whether the header includes P-Preferred-Service and/or P-Asserted-Service header fields. The P-Preferred-Service and/or P-Asserted-Service header fields may include information identifying a service that is associated with FQDN routing and may, accordingly, indicate that the SIP message is to be routed based on an FQDN associated with the second portion of the SIP URI. Alternatively, CSCF 115 may determine whether the header includes a SIP X header that includes information indicating that the SIP message is to be routed based on an FQDN associated with the second portion of the SIP URI. The SIP X header includes a SIP header that begins with the character "X."

As shown in FIG. 1F, and by reference number 195, CSCF 115 may route the SIP message using the first portion or the second portion based on the header of the SIP message. For example, CSCF 115 may cause the SIP message to be routed based on a result of performing an ENUM query when CSCF 115 determines that the SIP message supports "mmtel," in some cases when CSCF 115 determines that the header includes the keyword "mmtel." Alternatively, CSCF 115 may cause the SIP message to be routed based on an FQDN associated with the second portion of the SIP URI when CSCF 115 determines that the header includes the P-Preferred-Service and/or P-Asserted-Service header fields and that the P-Preferred-Service and/or P-Asserted-Service header fields include the information identifying the service that is associated with FQDN routing. Alternatively, CSCF 115 may cause the SIP message to be routed based on an FQDN associated with the second portion of the SIP message when CSCF 115 determines that the header is a SIP X header that includes information indicating that the SIP message is to be routed based on an FQDN.

Figure 1G:
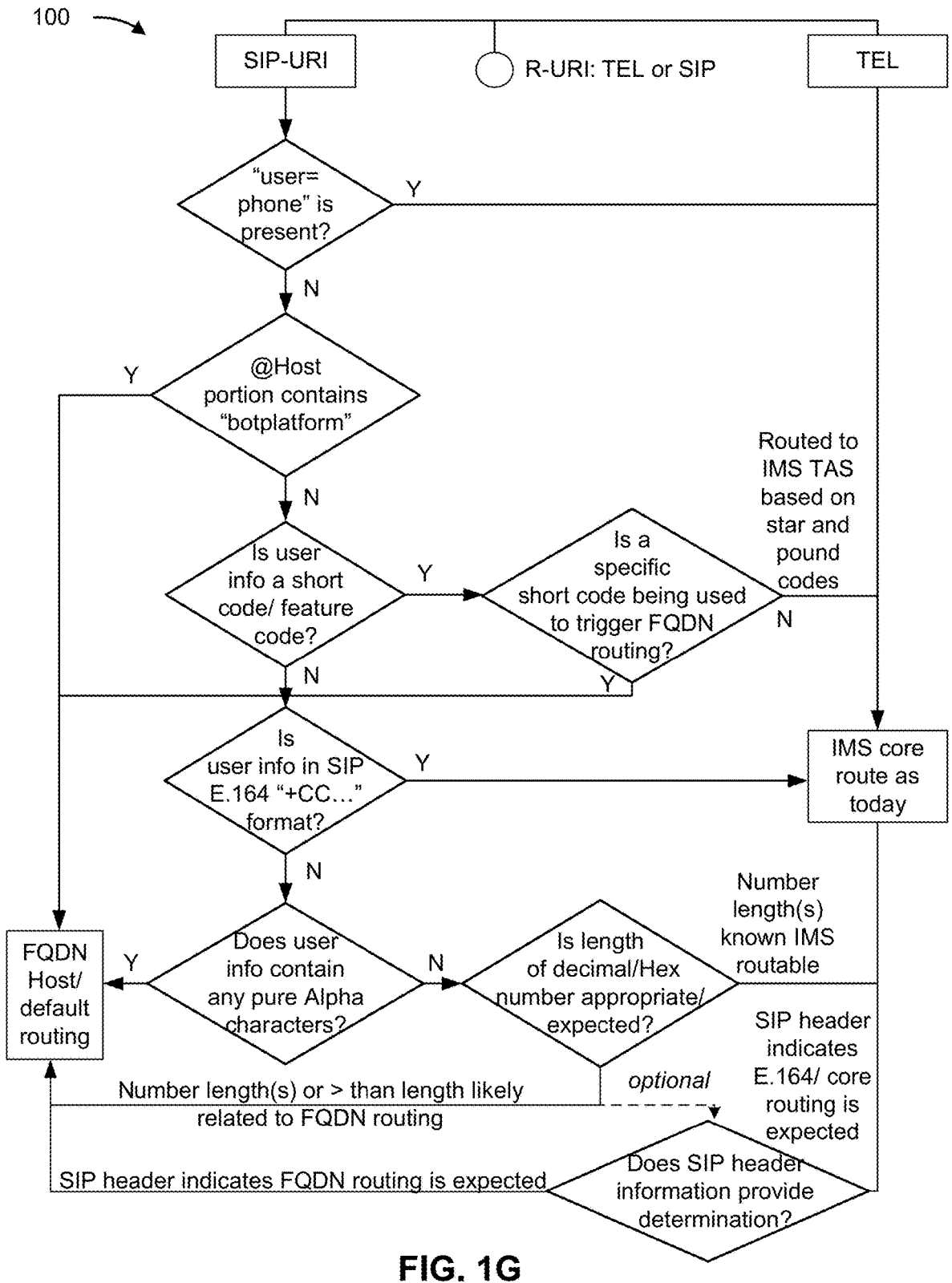

FIG. 1G is a flowchart of an example process associated with systems and methods for selectively routing a SIP message without a parameter identifying a telephone number. In some implementations, one or more process blocks of FIG. 1G may be performed by a device (e.g., CSCF 115). In some implementations, one or more process blocks of FIG. 1G may be performed by another device or a group of devices separate from or including the device, such as an application device (e.g., application device 120) and/or a user device (e.g., user device 105-1). As shown in FIG. 1G, CSCF 115 may determine whether a URI, of the SIP message, is a Tel URI or a SIP URI. If the URI is a Tel URI, CSCF 115 may cause the SIP message to be routed based on a result of performing an ENUM query.

As shown in FIG. 1G, if CSCF 115 determines that the URI is a SIP URI, CSCF 115 may determine whether the SIP URI includes a parameter (e.g., "user=phone") indicating that a first portion of the SIP URI is to be processed as a telephone number. If CSCF 115 determines that the SIP URI includes the parameter, CSCF 115 may perform an ENUM query using the first portion of the SIP URI and cause the SIP message to be routed based on a result of performing the ENUM query.

As shown in FIG. 1G, if CSCF 115 determines that the SIP URI does not include the parameter, CSCF 115 may determine whether a second portion of the SIP URI includes information identifying a service. For example, CSCF 115 may determine whether the second portion of the SIP URI includes the keyword "botplatform." If CSCF 115 determines that the second portion of the SIP URI includes the information identifying the service, CSCF 115 may cause the SIP message to be routed using the second portion of the SIP URI, as described above.

As shown in FIG. 1G, if CSCF 115 determines that the second portion of the SIP URI does not include the information identifying the service, CSCF 115 may determine whether the first portion of the SIP URI includes a code, such as a short code, a feature code, among other examples. If CSCF 115 determines that the first portion of the SIP URI includes the code, CSCF 115 may determine whether the code provides an indication that the SIP message is to be routed by way of the FQDN routing, as explained above. If CSCF 145 determines that the code does not provide the indication, CSCF 115 may provide the SIP message to the TAS for processing. If CSCF 115 determines that the code provides the indication, CSCF 115 may cause the SIP message to be routed by way of FQDN routing, in a manner similar to the manner described above in connection with FIG. 1B.

As shown in FIG. 1G, if CSCF 115 determines that the first portion of the SIP URI does not include a code, CSCF 115 may determine whether the first portion of the SIP URI includes information that is formatted according to an E.164 telephone number format. If CSCF 115 determines that the first portion of the SIP URI includes information that is formatted according to the E.164 telephone number format, CSCF 115 may perform an ENUM query using the first portion of the SIP URI and cause the SIP message to be routed based on a result of performing the ENUM query, in a manner similar to the manner described above in connection with FIG. 1A.

As shown in FIG. 1G, if CSCF 115 determines that the first portion of the SIP URI is not formatted according to the E.164 telephone number format, CSCF 115 may determine whether the first portion includes one or more alpha characters that are not hexadecimal characters. If CSCF 115 determines that the first portion of the SIP URI includes a character that is not a hexadecimal character, CSCF 115 may cause the SIP message to be routed using the second portion of the SIP URI, in a manner similar to the manner described above in connection with FIG. 1B.

As shown in FIG. 1G, if CSCF 115 determines that the first portion of SIP URI does not include one or more alpha characters that are not hexadecimal characters, CSCF 115 may determine whether the quantity of characters included in the first portion of the SIP URI exceeds the quantity of characters of a telephone number. If CSCF 115 determines that the quantity of characters exceeds the quantity of characters of an E.164 telephone number (or the threshold quantity of characters), CSCF 115 may cause the SIP message to be routed using the second portion of the SIP URI, in a manner similar to the manner described above in connection with FIG. 1B. If CSCF 115 determines that the quantity of characters matches the quantity of characters of an E.164 telephone number, CSCF 115 may cause the SIP message to be routed based on a result of performing the ENUM query, in a manner similar to the manner described above in connection with FIG. 1A.

As shown in FIG. 1G, CSCF 115 may determine whether a header of the SIP message includes information indicating whether the SIP message is to be routed using the first portion or the second portion of the SIP URI and may cause the SIP message to be routed accordingly.

Although FIG. 1G shows example blocks of a process systems and methods for selectively routing a SIP message without a parameter identifying a telephone number, in some implementations, the process of FIG. 1G may include additional blocks, fewer blocks, different blocks, or differently arranged blocks than those depicted in FIG. 1G. Additionally, or alternatively, two or more of the blocks of the process of FIG. 1G may be performed in parallel.

By enabling the CSCF to determine a manner for routing a SIP message as explained herein, the CSCF may preserve computing resources (e.g., processor resources, memory resources, communication resources, among other examples), network resources, and/or other resources that would have otherwise been consumed by unsuccessfully performing the ENUM query multiples times, transmitting (to the user device) a notification indicating that the SIP message cannot be routed, causing the user device to retransmit the SIP message, among other examples.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
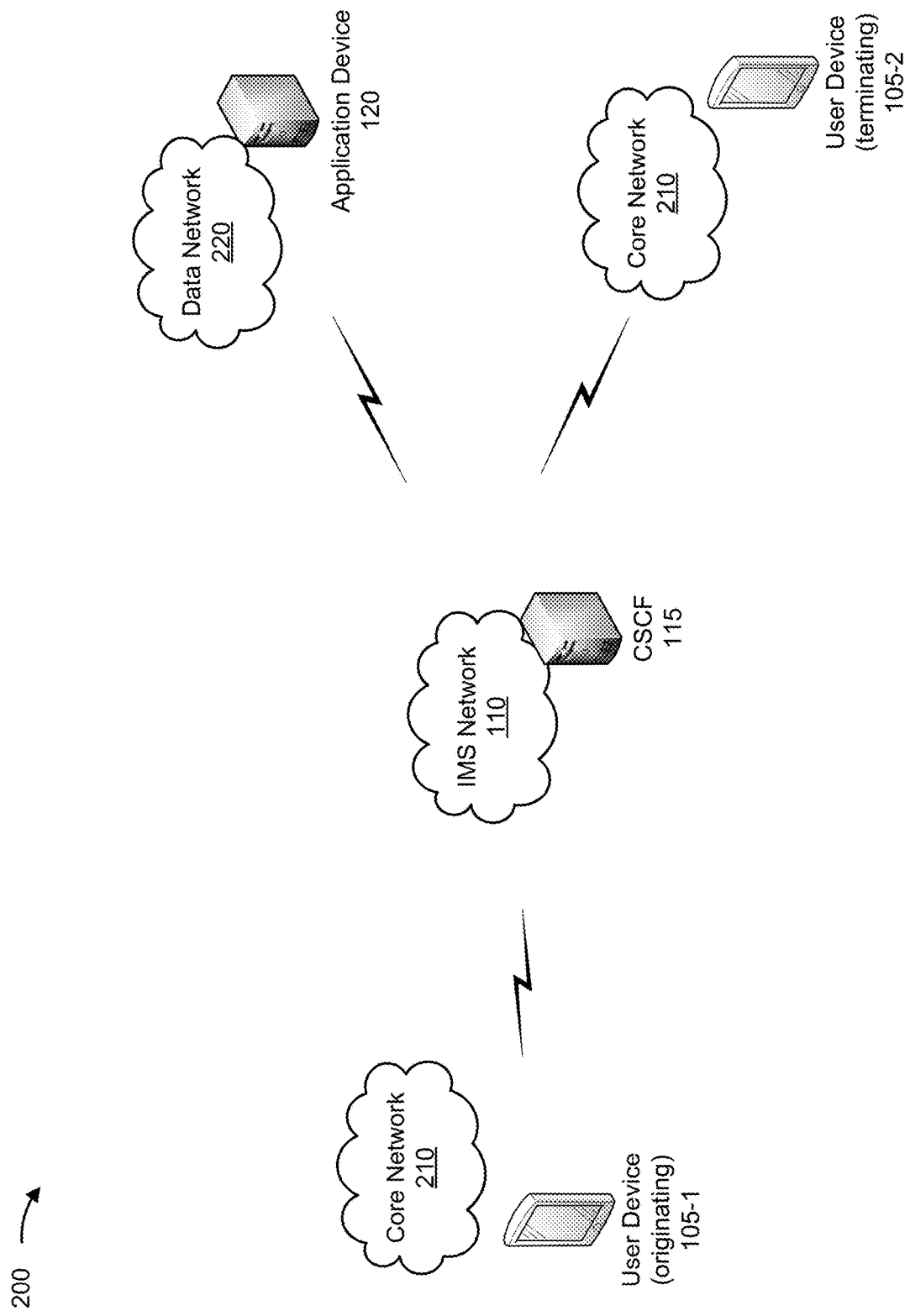
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include user devices 105, IMS network 110, CSCF 115, application device 120, core network 210, and data network 220. Devices and/or elements of environment 200 may interconnect via wired connections and/or wireless connections.

User device 105 includes one or more devices capable of receiving, generating, storing, processing, and/or providing information, as described elsewhere herein. User device 105 may include a communication device. For example, user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some examples, user device 105 may be associated with core network 210.

IMS network 110 includes one or more wired and/or wireless networks. For example, IMS network 110 may include an architectural framework or network (e.g., a telecommunications network) for delivering IP multimedia services.

CSCF 115 may include one or more devices for receiving, processing, and causing SIP messages to be routed toward one or more destinations of the SIP messages. In some examples, CSCF 115 may include a Proxy-CSCF (P-CSCF), a Interrogating-CSCF (I-CSCF), and/or a Serving-CSCF (S-CSCF). CSCF 115 may be included in IMS network 110.

Application device 120 includes one or more devices capable of receiving, generating, storing, processing, providing, and/or routing information, as described elsewhere herein. Application device 120 may include a communication device and/or a computing device. For example, application device 120 may include a server, such as an application server, a client server, a web server, a database server, a host server, a proxy server, a virtual server (e.g., executing on computing hardware), or a server in a cloud computing system. In some implementations, application device 120 includes computing hardware used in a cloud computing environment. In some examples, application device 120 may be associated with core network 210.

Core network 210 includes one or more wired and/or wireless networks. For example, core network 110 may include a cellular network (e.g., a fifth generation (5G) network, evolved packet system (EPS), a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. Core network 210 enables communication among the devices of example 100.

Data network 220 includes one or more wired and/or wireless networks. For example, data network 220 may include a LAN, a WAN, a MAN, a telephone network (e.g., the PSTN), a private network, an ad hoc network, an intranet, the Internet, a fiber optic-based network, among other examples, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
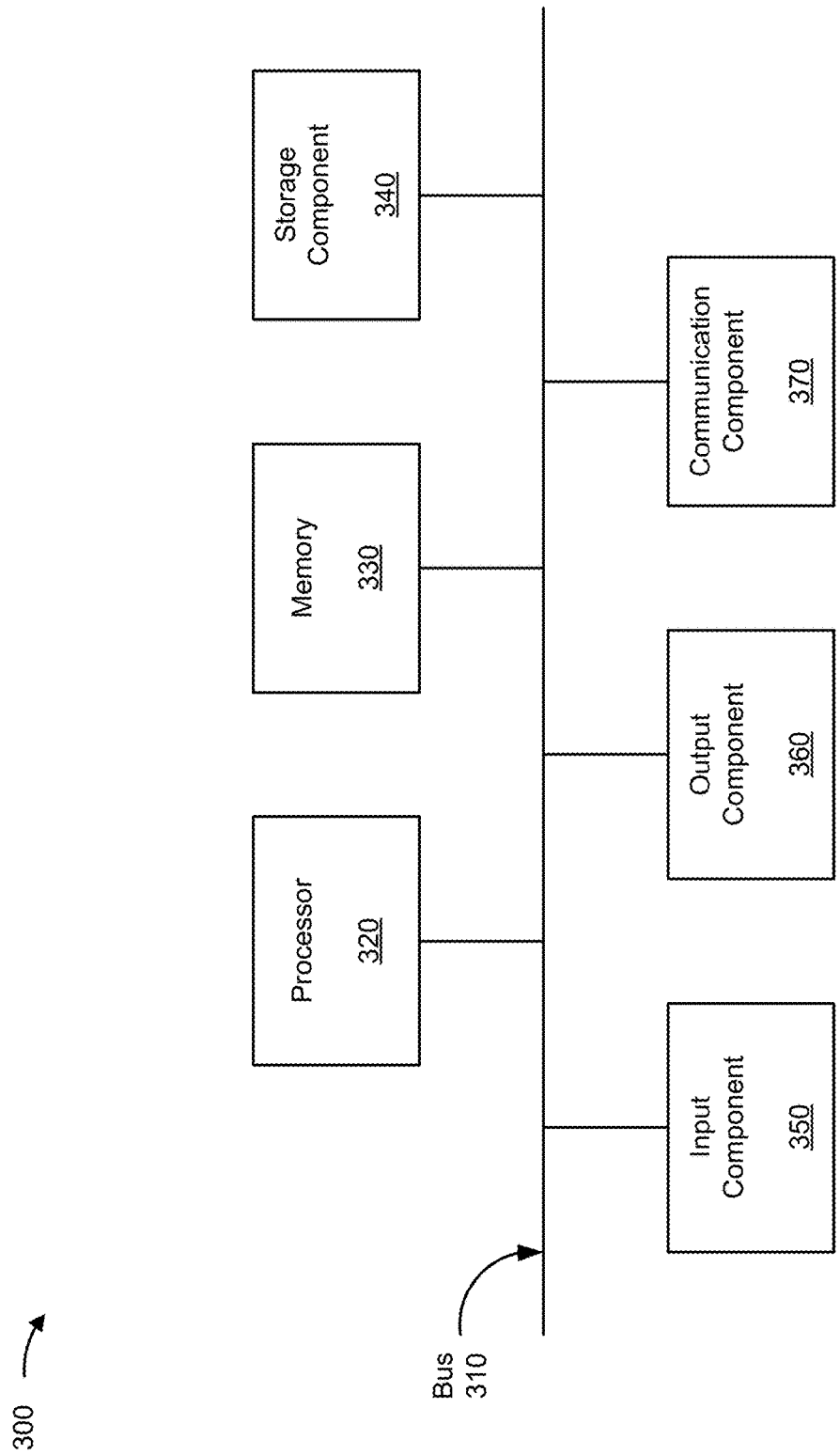
FIG. 3 is a diagram of example components of one or more devices of FIG. 2.

FIG. 3 is a diagram of example components of a device 300, which may correspond to CSCF 115, user device 105-1, and/or application device 120. In some implementations, CSCF 115, user device 105-1, and/or application device 120 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
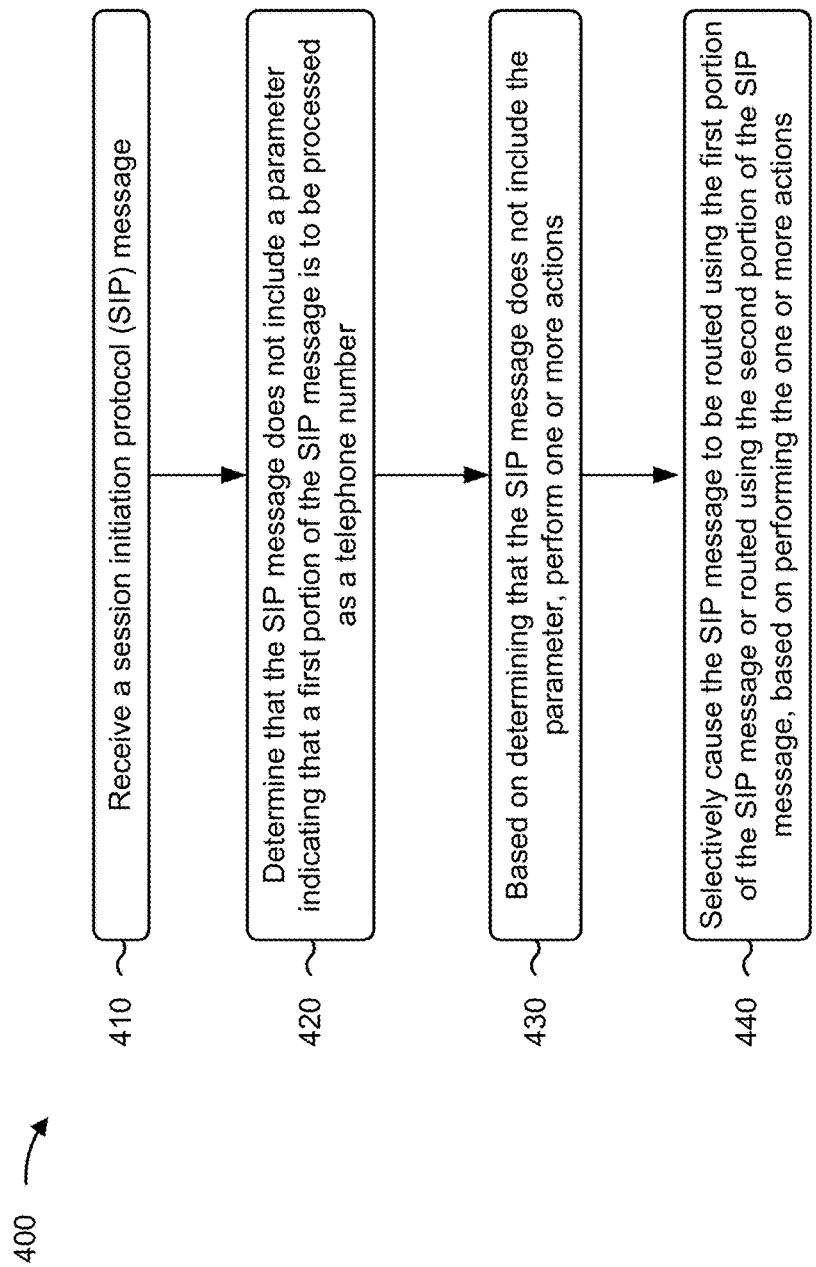
FIG. 4 is a flowchart of an example process associated with selectively routing a session initiation protocol (SIP) message without a parameter identifying a telephone number.

FIG. 4 is a flowchart of an example process 400 associated with systems and methods for selectively routing a session initiation protocol (SIP) message without a parameter identifying a telephone number. In some implementations, one or more process blocks of FIG. 4 may be performed by a device (e.g., CSCF 115). In some implementations, one or more process blocks of FIG. 4 may be performed by another device or a group of devices separate from or including the device, such as an application device (e.g., application device 120) and/or a user device (e.g., user device 105-1). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving a session initiation protocol (SIP) message (block 410). For example, the device may receive a session initiation protocol (SIP) message, as described above. In some implementations, the device may receive the SIP message from a user device.

As further shown in FIG. 4, process 400 may include determining that the SIP message does not include a parameter indicating that a first portion of the SIP message is to be processed as a telephone number (block 420). For example, the device may determine that the SIP message does not include a parameter indicating that a first portion of the SIP message is to be processed as a telephone number, as described above. In some implementations, the SIP message includes a SIP uniform resource identifier (URI), wherein the first portion of the SIP message is a user information portion of the SIP URI, and wherein the second portion of the SIP message is a host portion of the SIP URI.

As further shown in FIG. 4, process 400 may include performing one or more actions including one or more of: (block 430). For example, the device may perform one or more actions including one or more of: determining, by the device, whether a second portion of the SIP message includes information identifying a service associated with a network, determining, by the device, whether the first portion of the SIP message includes a code, determining, by the device, whether the first portion of the SIP message is formatted according to a format associated with a telephone number, or determining, by the device, whether the first portion of the SIP message includes one or more characters that are different than hexadecimal characters, as described above. For example, the device may analyze at least one of the first portion of the SIP URI or the second portion of the SIP URI to identify information indicating whether the SIP message is to be routed using the first portion of the SIP URI or routed using the second portion of the SIP URI.

In some implementations, performing the one or more actions comprises determining that the second portion of the SIP message includes the information identifying the service, and selectively causing the SIP message to be routed comprises causing the SIP message to be routed using the second portion of the SIP message based on determining that the second portion of the SIP message includes the information identifying the service.

In some implementations, performing the one or more actions comprises determining that the first portion of the SIP message includes the code, and determining whether the code includes information indicating that the SIP message is to be routed using the second portion of the SIP message, and selectively causing the SIP message to be routed comprises causing the SIP message to be routed using the first portion of the SIP message when the code does not include the information indicating that the SIP message is to be routed using the second portion of the SIP message, or causing the SIP message to be routed using the second portion of the SIP message when the code includes the information indicating that the SIP message is to be routed using the second portion of the SIP message.

In some implementations, performing the one or more actions comprises determining that the first portion of the SIP message is formatted according to the format associated with a telephone number, and selectively causing the SIP message to be routed comprises causing the SIP message to be routed using the first portion of the SIP message based on determining that that the first portion of the SIP message is formatted according to the format associated with a telephone number.

In some implementations, performing the one or more actions comprises determining that the first portion of the SIP message includes one or more characters that are different than hexadecimal characters, and selectively causing the SIP message to be routed comprises causing the SIP message to be routed using the second portion of the SIP message based on determining that the first portion of the SIP message includes one or more characters that are different than hexadecimal characters.

In some implementations, performing the one or more actions comprises determining that the first portion of the SIP message does not include one or more characters that are different than hexadecimal characters, and determining whether a quantity of characters, included in the first portion, matches a quantity of characters included in a telephone number based on determining that the first portion of the SIP message does not include characters that are different than hexadecimal characters, and selectively causing the SIP message to be routed comprises causing the SIP message to be routed using the first portion of the SIP message when the quantity of characters, included in the first portion of the SIP message, matches the quantity of characters included in a telephone number, or causing the SIP message to be routed using the second portion of the SIP message when the quantity of characters, included in the first portion of the SIP message, exceeds the quantity of characters included in a telephone number.

As further shown in FIG. 4, process 400 may include selectively causing the SIP message to be routed using the first portion of the SIP message or routed using the second portion of the SIP message, based on performing the one or more actions (block 440). For example, the device may selectively cause the SIP message to be routed using the first portion of the SIP message or routed using the second portion of the SIP message, based on performing the one or more actions, as described above.

In some implementations, the device may selectively cause the SIP message to be routed using the first portion of the SIP URI or routed using the second portion of the SIP URI based on analyzing the at least one of the first portion of the SIP URI or the second portion of the SIP URI.

In some implementations, the device may perform an E.164 number to URI mapping (ENUM) query using information included in the first portion of the SIP URI; and cause the SIP message to be routed based on a result of performing the ENUM query. In some implementations, the device may determine that the second portion of the SIP URI is associated with the second portion of the SIP URI; and cause the SIP message to be routed based on the FQDN.

In some implementations, performing the one or more actions may include analyze a header of the SIP message to determine whether the header includes information indicating whether the SIP message is to be routed using the first portion of the SIP URI or routed using the second portion of the SIP URI. In some implementations, selectively causing the SIP message to be routed may include cause the SIP message to be routed using the first portion of the SIP URI when the information, included in the header, indicates that the SIP message is to be routed using the first portion of the SIP URI, and cause the SIP message to be routed using the second portion of the SIP URI when the information, included in the header, indicates that the SIP message is to be routed using the second portion of the SIP URI.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
    receiving, by a device of an Internet Protocol (IP) Multimedia Subsystem (IMS) network, a session initiation protocol (SIP) message;
    determining, by the device, that the SIP message does not include a parameter indicating that a first portion of the SIP message is to be processed as a telephone number;
    determining, by the device and based on determining that the SIP message does not include the parameter, whether a second portion of the SIP message includes information identifying a chatbot service associated with a network;
    and
    selectively causing, by the device and based on determining whether the second portion of the SIP message includes information identifying the chatbot service associated with the network, the SIP message to be routed using the first portion of the SIP message or routed using the second portion of the SIP message.

2. The method of claim 1, wherein the SIP message includes a SIP uniform resource identifier (URI);
    wherein the first portion of the SIP message is a user information portion of the SIP URI; and
    wherein the second portion of the SIP message is a host portion of the SIP URI.

3. The method of claim 1, wherein determining whether the second portion of the SIP message includes information identifying the chatbot service associated with the network comprises:
    determining that the second portion of the SIP message includes the information identifying the chatbot service; and
    wherein selectively causing the SIP message to be routed comprises:
    causing the SIP message to be routed using the second portion of the SIP message based on determining that the second portion of the SIP message includes the information identifying the chatbot service.

4. A device, comprising:
    one or more processors configured to:
        determine that a Session Initiation Protocol (SIP) uniform resource identifier (URI), of a SIP message, does not include a parameter indicating that a first portion of the SIP is to be processed as a telephone number;
        based on determining that the SIP URI does not include the parameter,
        determine
        whether the first portion of the SIP URI includes a code;
        and
        selectively cause, based on determining whether the first portion of the SIP URI includes the code, the SIP message to be routed using the first portion of the SIP URI or using a second portion of the SIP URI.

5. The device of claim 4, wherein the device includes a Call Session Control Function (CSCF).

6. The device of claim 4, wherein, to determine whether the first portion of the SIP URI includes the code, the one or more processors are further configured to:
   determine that the first portion of the SIP URI includes the code and
   determine whether the code is associated with a service; and
   wherein, to selectively cause the SIP message to be routed, the one or more processors are further configured to:
   cause the SIP message to be routed using the first portion of the SIP URI when the code is not associated with the service, or
   cause the SIP message to be routed using the second portion of the SIP URI when the code is associated with the service.

7. A non-transitory computer-readable medium storing a set of instructions, the set of instructions comprising:
   one or more instructions that, when executed by one or more processors of a device of an Internet Protocol (IP) Multimedia Subsystem (IMS) network, cause the device to:
   determine that a Session Initiation Protocol (SIP) uniform resource identifier (URI), of a SIP message, does not include a parameter indicating that a first portion of the SIP message is to be processed as a telephone number;
   based on determining that the SIP message does not include the parameter, analyze at least one of the first portion of the SIP URI or a second portion of the SIP URI to identify information indicating whether the SIP message is to be routed using the first portion of the SIP URI or routed using the second portion of the SIP URI; and
   selectively cause the SIP message to be routed using the first portion of the SIP URI or routed using the second portion of the SIP URI based on analyzing the at least one of the first portion of the SIP URI or the second portion of the SIP URI.

8. The non-transitory computer-readable medium of claim 7, wherein the one or more instructions, that cause the device to selectively cause the SIP message to be routed using the first portion of the SIP URI or routed using the second portion of the SIP URI, cause the device to:
   perform an E.164 number to URI mapping (ENUM) query using information included in the first portion of the SIP URI; and
   cause the SIP message to be routed based on a result of performing the ENUM query.

9. The non-transitory computer-readable medium of claim 7, wherein the one or more instructions, that cause the device to selectively cause the SIP message to be routed using the first portion of the SIP URI or routed using the second portion of the SIP URI, cause the device to:
   determine that the second portion of the SIP URI is associated with a Fully Qualified Domain Name (FQDN); and
   cause the SIP message to be routed based on the FQDN.

10. The non-transitory computer-readable medium of claim 7, wherein the one or more instructions, that cause the device to analyze the at least one of the first portion of the SIP URI or the second portion of the SIP URI, cause the device to:
   perform a first action; and
   perform a second action based on a result of performing the first action.

11. The non-transitory computer-readable medium of claim 10, wherein the one or more instructions, that cause the device to perform the first action, cause the device to:
   determine whether the second portion of the SIP message includes information identifying a service associated with a network; and
   wherein the one or more instructions, that cause the device to perform the second action, cause the device to:
   determine whether the first portion of the SIP message includes a code when the second portion of the SIP message does not include information identifying the service.

12. The non-transitory computer-readable medium of claim 11, wherein the one or more instructions, that cause the device to analyze the at least one of the first portion of the SIP URI or the second portion of the SIP URI, cause the device further to:
   determine whether the first portion of the SIP URI is formatted according to an E.164 number format of the International Telecommunication Union Telecommunication Standardization Sector when the first portion of the SIP message does not include the code.

13. The non-transitory computer-readable medium of claim 7, wherein the one or more instructions, that cause the device to analyze the at least one of the first portion of the SIP URI or the second portion of the SIP URI, cause the device to:
   determine that the first portion of the SIP URI includes a code; and
   determine whether the code includes information indicating that the SIP message is to be routed using the second portion of the SIP URI; and
   wherein the one or more instructions, that cause the device to selectively cause the SIP message to be routed, cause the device to:
   cause the SIP message to be routed using the first portion of the SIP URI when the code does not include the information indicating that the SIP message is to be routed using the second portion of the SIP URI, or
   cause the SIP message to be routed using the second portion of the SIP URI when the code includes the information indicating that the SIP message is to be routed using the second portion of the SIP URI.

14. The non-transitory computer-readable medium of claim 7, wherein the one or more instructions, that cause the device to analyze the at least one of the first portion of the SIP URI or the second portion of the SIP URI, cause the device to:
   determine that the first portion of the SIP URI is formatted according to a format associated with a telephone number; and
   wherein the one or more instructions, that cause the device to selectively cause the SIP message to be routed, cause the device to:
   cause the SIP message to be routed using the first portion of the SIP message based on determining that the first portion of the SIP message is formatted according to the format associated with the telephone number.

15. The non-transitory computer-readable medium of claim 7, wherein the one or more instructions, that cause the device to analyze the at least one of the first portion of the SIP URI or the second portion of the SIP URI, cause the device to:
   determine that the first portion of the SIP URI includes one or more characters that are different than hexadecimal characters; and wherein the one or more instructions, that cause the device to selectively cause the SIP message to be routed, cause the device to:
cause the SIP message to be routed using the second portion of the SIP URI based on determining that the first portion of the SIP URI includes the one or more characters that are different than hexadecimal characters.

16. The non-transitory computer-readable medium of claim 7, wherein the one or more instructions, that cause the device to analyze the at least one of the first portion of the SIP URI or the second portion of the SIP URI, cause the device to:
determine whether a quantity of characters, included in the first portion, matches a quantity of characters included in a telephone number; and
wherein the one or more instructions, that cause the device to selectively cause the SIP message to be routed, cause the device to:
cause the SIP message to be routed using the first portion of the SIP URI when the quantity of characters, included in the first portion of the SIP message, matches the quantity of characters included in a telephone number, or
cause the SIP message to be routed using the second portion of the SIP URI when the quantity of characters, included in the first portion of the SIP URI, exceeds the quantity of characters included in a telephone number.

17. The non-transitory computer-readable medium of claim 7, wherein the one or more instructions, that cause the device to analyze the at least one of the first portion of the SIP URI or the second portion of the SIP URI, further cause the device to:
analyze a header of the SIP message to determine whether the header includes information indicating whether the SIP message is to be routed using the first portion of the SIP URI or routed using the second portion of the SIP URI; and
wherein the one or more instructions, that cause the device to selectively cause the SIP message to be routed, cause the device to:
cause the SIP message to be routed using the first portion of the SIP URI when the information, included in the header, indicates that the SIP message is to be routed using the first portion of the SIP URI, and
cause the SIP message to be routed using the second portion of the SIP URI when the information, included in the header, indicates that the SIP message is to be routed using the second portion of the SIP URI.

18. The non-transitory computer-readable medium of claim 7, wherein the one or more instructions, that cause the device to analyze the at least one of the first portion of the SIP URI or the second portion of the SIP URI, cause the device to:
determine that the second portion of the SIP URI includes information identifying a service associated with the IMS network,
wherein the service includes a chatbot service or a service associated with Rich Communication Services (RCS); and
wherein the one or more instructions, that cause the device to selectively cause the SIP message to be routed, cause the device to:
cause the SIP message to be routed using the second portion of the SIP URI to a network device associated with the service based on determining that the second portion of the SIP URI includes the information identifying the service.

19. The non-transitory computer-readable medium of claim 7, wherein the one or more instructions, that cause the device to analyze the at least one of the first portion of the SIP URI or the second portion of the SIP URI, cause the device to:
determine that the first portion of the SIP URI is formatted according to a format associated with a telephone number,
wherein the format includes an E.164 telephone number format of the International Telecommunication Union Telecommunication Standardization Sector; and
wherein the one or more instructions, that cause the device to selectively cause the SIP message to be routed, cause the device to:
cause the SIP message to be routed, to a user device, using the first portion of the SIP URI based on determining that the first portion of the SIP URI is formatted according to the format associated with the telephone number.

20. The non-transitory computer-readable medium of claim 7, wherein the first portion of the SIP URI is a user portion of the SIP URI and the second portion of the SIP URI is a host portion of the SIP URI.

* * * * *